Patented Nov. 8, 1927.

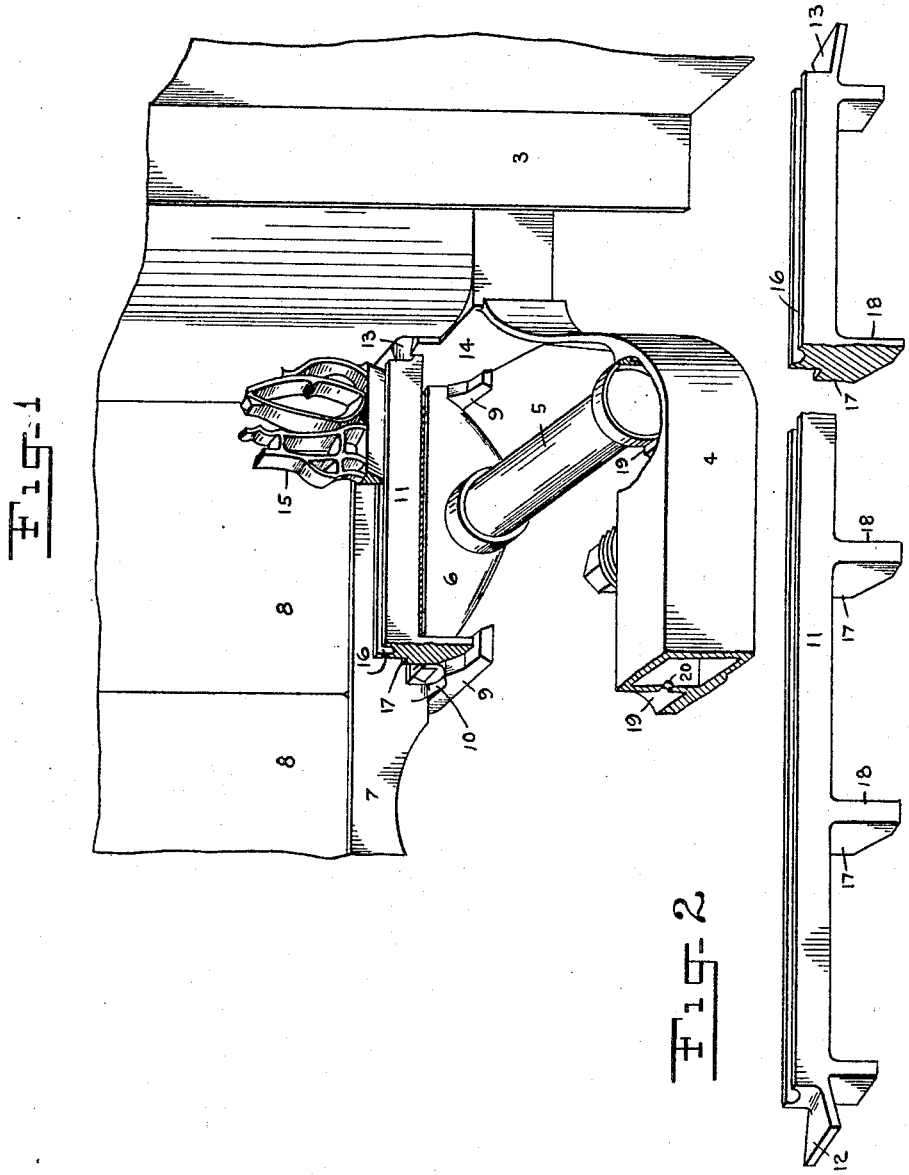

1,648,035

UNITED STATES PATENT OFFICE.

CLARENCE J. WALTEMADE, OF NEW YORK, N. Y.

GAS HEATER.

Application filed March 22, 1926. Serial No. 96,392.

My invention relates to improvements in gas heaters, and more particularly has reference to and is illustrated in the accompanying drawings in its application to a gas heater for the home, of the open front type. The invention has especial reference to the grill support which provides means for insuring the proper positioning of the burners.

Referring to the accompanying drawings, Fig. 1 illustrates in front perspective, parts being broken away, a fragment of an open front gas heater, embodying an application of my invention. Fig. 2 is a perspective view, partly broken away, illustrating the grill support. 3 indicates a fragment of the frame of the heater, and 4 indicates the gas manifold. 5 indicates the burner tube, and 6 the burner head. 7 indicates a fragment of a back support for the radiants 8, the same being provided with forwardly extending lugs 9 with curved seatings 10 for the burner head, as shown. Above and in front of these lugs the channel grill support 11 projects across the front of the heater, the ends being provided with key-shaped terminals 12, 13, which are seated in side frames such as 14, as shown. 15 indicates a fragment of the grills supported in the channel 16 as shown, and 17 indicate rearwardly projecting parts of the downwardly projecting lugs 18.

To insert the burner, same is lifted from beneath and behind the channel 11, so as to rest upon the lugs 9, as shown in front of the back support 7, allowing the open end of the tube 5 to come in position for the seating 19 at the back of the manifold 4. The head 6 of the burner spans the spaces between the lugs 9 where it is seated at the back and is prevented from coming forward by the rearwardly projecting portion 17 below channel 16 on the lugs 18. This insures proper positioning of the burner, whereas without the projection 17, the same may be pulled forwardly, thus reducing the amount of the air which mixes with the gas as the latter issues from the usual orifice 20, causing bad combustion, endangering those present with suffocation.

Of course it will be understood that various modifications may be made in the construction and arrangement of parts without departinng from the spirt of the invention as claimed.

I claim:—

1. In combination with a heater of the class described, a radiant support across the heater back of the burners thereof, a grill support substantially parallel therewith and in front of said radiant support, means for supporting burner heads between said supports, and an abutment at the back of said grill support for preventing the forward shifting of said burner heads.

2. In combination with a heater of the class described, a radiant support across the heater back of the burners thereof, a grill support substantially parallel therewith and in front of said radiant support, means for supporting burner heads between said supports, and means in combination with said grill support for preventing the forward shifting of said burner heads.

3. In combination with a heater of the class described, a radiant support across the heater back of the burners thereof, a grill support substantially parallel therewith and in front of said radiant support, means for supporting burner heads between said supports, and an abutment at the back of said grill support for preventing the forward shifting of said burner heads, said abutment extending below said support and resting upon said means.

In testimony whereof I hereunto affix my signature.

CLARENCE J. WALTEMADE.